Patented July 4, 1939

2,164,329

UNITED STATES PATENT OFFICE 2,164,329

ROOFING GRANULES

Clifford Langley Jewett, Minneapolis, Minn., assignor to Minnesota Mining & Manufacturing Company, St. Paul, Minn., a corporation of Delaware No Drawing. Application July 15, 1935,
Serial No. 31,451

3 Claims. (Cl. 91—70)

The present invention relates to increasing and even effecting the adhesion between materials which do not readily adhere to each other or between which the adhesion tends to become disrupted, and further relates to an improved method of producing such materials and effects, and has special reference to the provision of means for causing organophilic hydrophobic materials to adhere to hydrophilic materials. While the present invention has a wide field of usefulness, it has peculiar utility for employment under conditions where a hydrophilic object is exposed to moisture, such as rain, dew, and the like, and under such exposure has a tendency to separate from an organophilic matrix in which it may be embedded or by which it may be supported.

As an example of a field of utility of the present invention, reference is made to such sheeted material as so-called "prepared roofing" which is manufactured and marketed in various forms, e. g., shingles, sheets, rolls, etc., and commonly comprises a felted layer of fibrous material (which may be paper, rags, asbestos, and the like, impregnated with such bituminous material as asphalt or tar and to a greater or less extent thereby united and rendered waterproof) upon which is imposed a further coating of bituminous material. This last mentioned coating serves as a protective coating for the first mentioned layer and may also serve as a support for a weathering coating such as granules or grits of various kinds. Among those which have been in more or less common use in the art are more or less comminuted natural products such as sand, gravel, and stone of various compositions and comminuted artificial products such as slag, brick, and terra cotta.

Latterly, artificially colored comminuted material such as suitable granules provided with a glazed surface have come largely into use, especially, for example, a form of granule comprising a crushed quartzitic base having a superficially hard ceramic coating.

The so-called "natural" products above referred to are, to a greater or less extent, porous and hydrophilic, and the so-called "artificial" products, while not being porous in the sense that the so-called "natural" ones are, are still markedly hydrophilic.

In practice it has been found that both the so-called "natural" and the so-called "artificial" products when exposed to atmospheric conditions involving such phenomena as more or less extreme variations in temperature and humidity, the winds and the impurities contained in the air and the additional mechanical effects of rain beating on roofing materials to which they are applied tend to become loosened in situ and disengaged from the supporting layer above referred to. This has various deleterious effects, among which may be mentioned the disfigurement of the material owing to the exposure of the underlying black bituminous coating, the change in the color tone of the roofing where colored surfacing materials are employed, the exposure of the unsurfaced portions to the elements which may allow water to penetrate the underlying fibrous coating and eventually lead to distortion and even partial destruction of the roofing.

This disengagement of the roofing particles from the supporting layer is apparently due to several factors, among which may be mentioned, firstly, the relatively slight adhesion of the bituminous constituents of the supporting layer to the coating particles which are usually hydrophilic.

From these factors it results that when the prepared roofing including granular hydrophilic material supported by bituminous material is exposed to moisture preferential wetting of the granular material by water takes place. The granular material being hydrophilic readily permits the entrance of moisture at the contact face thereof with the bituminous material, disrupting the bond therebetween, and loosening the particles in situ.

Even the presence of moisture which has been adsorbed by the granular material and expanded by a rise of temperature, may exert a physical force in loosening the particles in position.

Furthermore, upon any freezing of the accumulated water and the consequent expansion thereof, the bond between the particles and the support is disrupted and the particles are loosened in position.

One of the objects of the present invention is the provision of improved means for increasing the adhesion, (in fact, actually attaining a more perfect adhesion), between materials which normally have a relatively less degree of adhesion, the one for the other, and one whereby each and every of the drawbacks aforementioned may be obviated.

Another object is the provision of an improved method for producing the effects and also the means just referred to.

A further object is the production of an improved intermediate material which serves to change the surface of the hydrophilic and organophobic material to that of an organophilic material.

A further object of the invention is to produce such composite structures as prepared roofing having a colored surface wherein the longevity of such surface may be increased, and an improved method for producing such result.

A further object of the invention is to provide an improved composition of material and an improved method of applying such material whereby the aforementioned changes in the hydrophilic material may be accomplished.

One exemplification of a procedure for carrying out the present invention and attaining the objects hereinabove recited, as well as certain additional benefits and advantages which will hereinafter appear, is the following.

A water soluble condensation product of phenol (90% phenol and 10% water), and formaldehyde solution in water (about 37% by weight) is prepared by reacting these materials together at a moderate temperature (e. g., 110° to 130° F.) in the presence of an alkaline catalyst. A suitable catalyst for this reaction is barium hydroxide.

An illustration of the contents of a batch used for preparing the condensation product is the following:

214# (37% by weight) formaldehyde (approximately 10% in excess of the theoretical requirement to insure complete reaction and to compensate for any loss by evaporation).
248# phenol (10% water).
2# barium hydroxide.

This reaction is carried on for a period (which may be twenty-four hours) and to a point where the product comprises primarily a water solution of ortho- and para-hydroxybenzyl alcohols.

When the condensation reaction has proceeded to the desired point which of course is short of water-insolubility, and may be readily determined by analysis for the quantity of uncombined formaldehyde, which may be approximately 8% by weight of the mixture, more or less, the catalyst is removed by precipitation with carbonic or oxalic acid to arrest reaction at the water soluble stage to prevent premature resin formation. The resulting product contains approximately 65% of resin-forming material dissolved in water and upon being heated at a suitable temperature (e. g. 300° F.) has the property of further reacting to form an insoluble and infusible hard resin of the so-called "Bakelite type".

One exemplification of the employment in practice of the aforementioned water soluble condensation product is to further attenuate it by admixing it in water in the desired proportions which, for the purposes of coating ceramic granules, may be conveniently one part of the solution to twenty parts of water, or more as may be desired.

This attenuated solution is conveniently reduced to a mist in injecting it into a flowing air stream which subdivides the liquid stream into exceedingly fine particles.

While this solution may be applied to the granules, heated or unheated, in various ways, it has been found convenient to direct the stream of mist upon heated granules in order to perform the operation most economically.

In the case of coated granules, e. g., ceramic granules, this may be done by exposing the granules, after they have been given their ceramic coating and are shortly ready to pass from a cooling chamber to a flowing stream of air carrying the water soluble material in the form of the mist above referred to. Upon the evaporation of the water, the condensation product is transformed into a water-insoluble state, and though the high temperature of the granules is materially reduced by the water, the polymerization is not deleteriously affected by any such cooling of the granules.

This exposure of the granules to the mist is effected at a point at which their high temperature is reduced to a suitable degree (e. g. 600° F.) where the resin-forming material will not be harmfully affected by the residual heat of the newly coated glazed granules, but such temperature will still be sufficiently high to effect the transformation of the condensation product into an insoluble stage.

The residual heat in the newly formed ceramic granules after exposure to the mist referred to should always be sufficient to set up and insolubilize the resin-forming content by converting it from a water soluble state to a water insoluble state by the evaporation of the water and the carrying out of the reaction to at least a desirable intermediate point, if not in fact an end point.

It has been found that where an elongated and inclined rotating cylinder is employed as a cooler for reducing the granules from the ceramic form and temperature to a temperature where they can be conveniently stored or otherwise handled, such exposure to such mist insures that each granule is well exposed to such mist.

From the foregoing it will be understood that by the employment of the present invention it is possible to avoid the cost of reheating and rehandling the treated product and likewise to avoid introducing any harmful factors in processes heretofore employed, by interpolating a novel procedure which reduces greatly the cost of the resultant product, utilizing therein a high temperature, i. e., one at which the temperature of the material to be treated has been reduced to one which on the one hand is below that which would deleteriously affect the condensation product, but on the other hand which is still high enough to bring about substantially immediate transformation thereof. It will be understood further that the higher the temperature that may safely be employed, the better the results from the standpoint of economy.

Those who are skilled in the art will further appreciate that under some circumstances and for some purposes the desirable effects of the present invention may be attained by the employment of the raw materials (e. g. phenol and formaldehyde with, or in some cases without a suitable catalyst which is preferably basic) on the material to be treated without waiting for the reaction to take place before the application of the raw materials or a mixture thereof.

It will also be evident that the water solution of condensation products of formaldehyde and phenol (and in the event that a catalyst has been employed, with catalyst substantially removed,) may have introduced (or reintroduced) into it a short time before application, a quantity of catalyst for the purpose of reducing the time and/or temperature, required to complete the resinification.

Equally it will be understood that some of the beneficial effects of such a treatment may be attained by carrying the reaction to some stage short of alcohol insolubility, it being however appreciated that the resin-forming material should be applied in a stage where it is capable of orientation upon the material treated, and the greater the degree of orientation the better the resultant product.

Ceramic granules treated in accordance with the present invention have certain notable characteristics, among which may be mentioned the following:

(1) The desired product resulting from the treatment referred to adheres excellently to the surface of the granule, even after a lapse of time.

(2) The treated granule thus prepared presents a surface to which the bituminous coating (e. g. asphalt) very readily and firmly adheres, to the extent that water is not effective in destroying the bond thus formed, and to the extent that the bond beween the asphalt and the granule is not ruptured and the adhesion therebetween is not interfered with by atmospheric changes.

The deposit upon the granule surfaces formed by the treatment hereinabove described is characterized by an orientation of the polar molecules from which the resinous condensation product is formed, in such a way that the hydrophilic groups within these molecules are, respectively, oriented toward and adsorbed upon the surface of the granules. This orientation occurs while the condensation product is in the water soluble stage and before the resin is fully formed and finally hardened. Upon heating of the oriented film a further reaction takes place, and by polymerization and/or condensation a resinous deposit is produced which is insoluble in either water or organic solvents such as are ordinarily present in the bituminous coating of roofing material.

The orientation of the hydrophilic groups of the hydroxybenzyl alcohols toward the hydrophilic surface of the silicate mineral matter results in the establishment of an effective bond at the inter face. Subsequent resinification of these adsorbed and oriented molecules produces a resinous deposit with great internal strength and resistance to moisture, the deposit being characterized by orientation of the hydrophilic groups toward the surface of the granule.

The external surface of the product thus produced as exposed probably has substantially the composition of a phenolic resin. However, although it is possible that some orientation extends even to the surface, it is important to realize clearly that a phenolic resin as a whole is readily wet and bonded by bituminous materials and that it is not essential that the organophilic parts of the molecules alone be exposed upon the external surface of the treated granules. Inasmuch as experience shows that asphalts and similar bituminous materials wet and readily adhere to phenolic resins, it is found that the granules thus treated are readily bonded by such bituminous materials. It is apparent that this is accomplished by imparting organophilic properties to the external surface of the silicate mineral base material to replace its own hydrophilic properties by organophilic ones. Such a deposit is found to be effective even when its thickness corresponds to something of the order of 10 molecules, or less, of the original hydroxybenzyl alcohol from which the resin is derived. Deposits of such a thickness are not necessarily impervious to hydrophilic substances, such as water, or to bituminous substances such as are used in roofing compositions.

Further, microscopic examination of glass subjected to such mist shows a spotty effect, i. e., isolated spots of the resinous condensation product, which indicates that one of the essential aspects of the invention is the employment of merely a sufficient amount of the resinous condensation product to attain the desired end, and that a complete encasement or impervious coating is by no means necessary where there is a true adhesion of the resinous condensation product as counter-distinguished from a mere coating or contacting of the resinous material with the mineral material, even though accompanied by penetration thereof in the latter cases.

In fact it is possible to demonstrate practically that such deposits as are contemplated in the products of the process included within the present invention are to a certain degree permeable to certain hydrophilic substances.

In fact, it is further possible to demonstrate practically that by depositing a mist of the desired product referred to upon a sheet of glass and then applying an asphalt coating to the glass and submerging the composite in water as compared with an asphalt coating applied directly on the glass and so submerged makes manifest much better adhesion of the asphalt in the former case than in the latter case.

While reference has been made to water solutions of resinous condensation products and their polymerization by heat, the present invention is also intended to include other hydrophilic materials which, upon application to a hydrophilic base, may by suitable conversion (e. g., by heat) be so transformed externally as to form on such hydrophilic materials an organophilic surface which may be in the form of an adherent organophilic coating. One example of this phase of the invention is the embodiment thereof in an alcohol soluble resinous product, and the method of employing the same.

It will be readily appreciated that the employment of the invention with water as an attenuating medium has great advantages from the standpoint of saving of costs as compared with the use of alcohol or even mineral spirits as a vehicle. Notwithstanding this, it is to be understood however, that alcohol solutions of resin-forming materials which contain hydrophilic groups are found to be of utility in carrying out the present invention. Other oxygen containing solvents such as acetone may also be used. Saligenin is an example of a resin-forming material which may be employed in connection with these various solvents. While preferably hydrophilic solvents are utilized it will be understood that beneficial use may be made of resin-forming materials in a non-hydrophilic vehicle under certain circumstances, of which a cresol-formaldehyde condensation product dissolved in benzene ($C_6H_6$) is an example.

It is known that it has been suggested that caseins and water insoluble caseinates might be used as coatings for granules to be imbedded in bituminous roofing materials. Such materials, together with the glues, are hydrophilic substances and are more or less highly polar but lack one of the desired characteristics, namely, resistance to imbibition of water. It is known, of course, that glues and caseins may be rendered "insoluble" in water but even the ones which are most resistant to moisture show some tendency to be wetted by and to imbibe water. Such materials however they may adhere to the mineral surfaces, do not adhere to bituminous substances in the presence of moisture, even though in the absence of moisture such adhesion to bituminous materials may be present.

It is also known that it has been suggested to employ a solution of natural or synthetic resin or a mixture of both in an organic solvent such as naphtha or benzol, but in this connection it is to be observed that such solvents are non-polar ones and as such are not as readily adsorbed by hydrophilic surfaces as are polar solvents, and furthermore, that the heterogeneous groups of coating materials proposed include not only substances which are polar to a minor degree, but also substances which are relatively non-polar, and no examples are known to be employed in the art to which this invention pertains, for the purposes of this invention which are properly to be termed highly polar substances. Any hydrophilic groups that may be contained within the molecules represented by such known procedure represent such a small fraction of the total mass that the molecules as a whole would be so slightly polar and the tendency toward orientation would be so slight as to render such materials undesirable for the purposes of the present invention.

In the case of a solution of such synthetic resins in an organic solvent such as naphtha or benzol, even if the final film had an overall chemical composition similar to the deposit resulting from the treatment of the present invention, still it is apparent that, in spite of any superficial similarity, the already completely formed water insoluble resin would show very little orientation of the hydrophilic groups toward the silicate surfaces of the granules, whereas in the case of the treatment of the granules according to the present invention it is clear that the orientation of the hydrophilic groups has taken place before the polymerization or condensation into the water insoluble phase takes place.

Another example of the benefits and advantages of the use of resinous condensation products in a water soluble stage as contrasted with the use of synthetic resins which have been completely formed and are employed in an organic solvent is that in the latter case it has been proposed to use two to ten gallons of liquid (containing presumably approximately 120 to 600 ounces of solids) per ton of granules treated, whereas in the employment of the present invention very low concentrations such as five ounces of solids to the ton prove to be highly efficacious.

A major purpose of the orientation of the groups within the deposit on the surface of the granules is to provide an effective bond between the deposit itself and the granule upon which it is to be deposited. This function is not provided for by any known suggestions. However they may provide for adhesion between the external surface of a thoroughly coated granule and the asphaltic material, they do not provide for an effective bond between the deposit and the granule itself.

Those who are skilled in the art will appreciate that adhesion between the treated granule and the bituminous supporting layer is not a function of filling any pores of the granule nor of completely coating or encasing the granules, but is a matter of presenting a sufficient amount of organophilic surface to hold the granule in situ in the coating.

While covering material such as so-called prepared roofing if produced in pursuance of the procedure hereinbefore set forth is not deleteriously affected by rain, dew, humidity or atmospheric changes, equally the granule is fixed in situ in the bituminous base and not deleteriously affected by the constituents thereof. That part of the granule surface which is in contact with the supporting coating is united thereto, and that superficial portion which is exposed to the atmosphere may carry such a small amount of the deposit that no change in the underlying color of the granule comes about, and such alteration of the appearance of the surface of the granule as are incident to the use of thick or heavy coatings heretofore suggested are entirely obviated, and the cost of carrying out the treatment of the granules is reduced to a small fraction of the terms heretofore suggested.

A marked advantage of the employment of a water-soluble material, as distinguished from a solution of resinous or resin-forming material in mineral oils or even alcohol, is the avoidance of the production of toxic fumes and/or explosive vapours.

It will be appreciated by those skilled in the art that the process including the exposure of hot granules, as they are still hot from the kiln, to a mist, such as above described, has marked advantages in the saving of any expense of reheating and rehandling, and of less time incident thereto.

Furthermore if it is desired to apply a treatment of paraffine oil to the finished granules such as is commonly done, such oiling may be conveniently effected immediately after the completion of the resin formation without deleteriously affecting the resinous deposit, with like saving of expense.

One of the characteristics of material produced in accordance with the present invention is that the treated material is provided with a substantially immobile deposit of a substance specifically adsorbed thereupon.

By "substantially immobile" is meant that the deposit shows no appreciable tendency to flow relatively to the base within the ordinary range of atmospheric temperatures.

While the present invention has been described in connection with such products as prepared roofing, it will be understood that it has fields of technical application widely separated therefrom such, for example, as the surface coating of roads, employing with sand or gravel or crushed stone applied to a bituminous coating, or a mixture thereof to a suitable base, whereby a wearing surface highly resistant to standing water, heavy rains, floods and the like is attained. Another example is the use of comminuted hydrophilic material treated according to the present invention as a filler for organophilic material such as asphalt, useful in forming the wearing surface of such roads. A further example is the interposition of the improved bonding material as a deposit on the superficies of a concrete road preparatory to coating the same with asphalt, or even of a waterbound macadam road preparatory therefor.

Having thus described my invention, what is claimed as new and desired to secure by Letters Patent is the following:

1. The process of treating granular mineral material which includes the steps of adding to the particles an aqueous solution of a potentially reactive phenolaldehyde resinous material to superficially treat the exterior surface of said particles, the aqueous vehicle being driven off and the resinous material being converted into an insoluble stage by heat, the quantity of the aqueous material being added to leave upon the granular mineral particles a small amount of deposit that no change in the underlying color of the granule comes about but providing for adhesion between the external surface of the granule with respect to organic materials of the character of asphalt and providing an effective bond between the deposit and the granule itself, said quantity of the deposit being of the order exemplified by five (5) ounces of solids of the insoluble resinous material to one (1) ton of the granular mineral particles.

2. As a new article of manufacture, granulated mineral material, the surfaces of the several granules having applied thereto a water insoluble resinous material in accordance with the process of claim 1.

3. As a new article of manufacture roofing material comprising a base sheet of felted or woven fabric, a waterproofing coating of asphaltic material and a surface layer of granular mineral material bonded to said sheet by said waterproofing coating, said granular mineral material having a surface treatment in accordance with the process set forth in claim 1.

CLIFFORD LANGLEY JEWETT.